April 3, 1962  E. O. STONE  3,028,544
CATHODE RAY TUBE SPOT SIZE MEASURING DEVICE
Filed Nov. 2, 1959
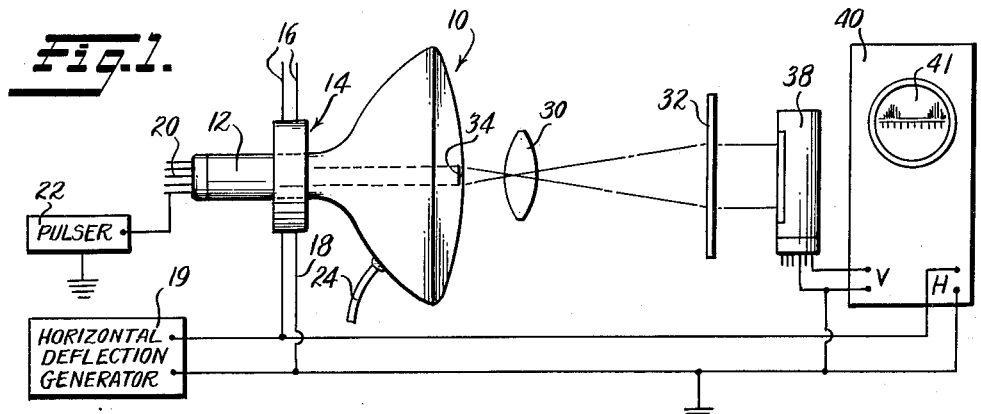
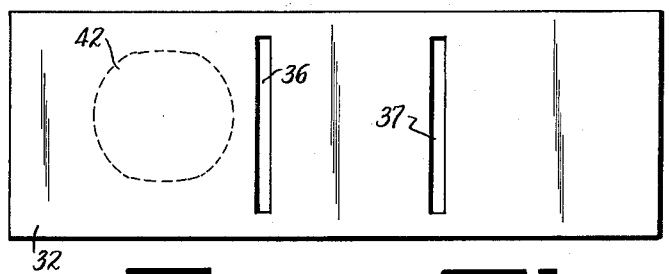
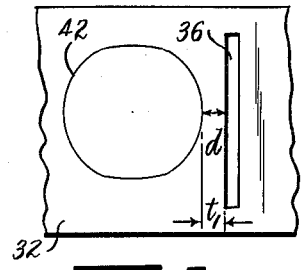
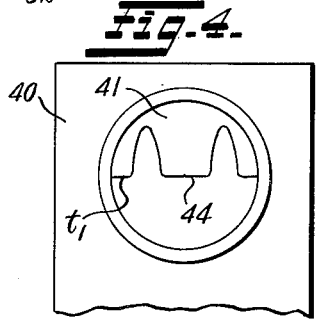
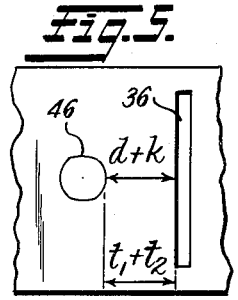
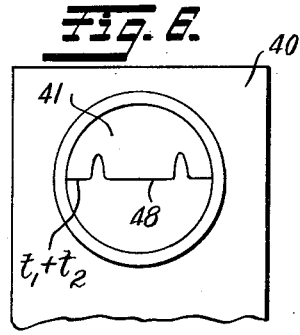
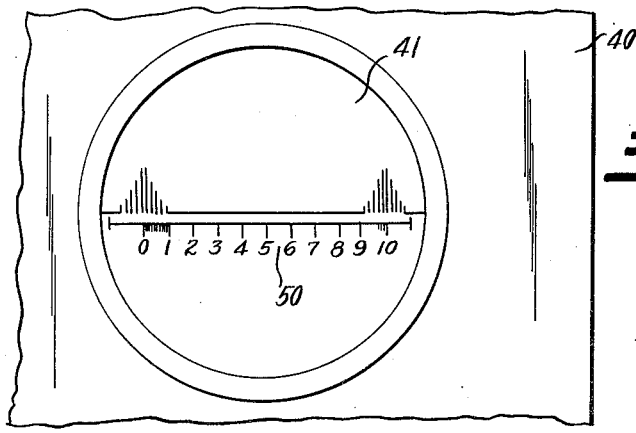
INVENTOR.
Elmer O. Stone
BY Michael Hertz,
ATTORNEY United States Patent Office 3,028,544
Patented Apr. 3, 1962

3,028,544
CATHODE RAY TUBE SPOT SIZE MEASURING
DEVICE
Elmer O. Stone, Seneca Falls, N.Y., assignor to Sylvania
Electric Products Inc., a corporation of Delaware
Filed Nov. 2, 1959, Ser. No. 850,448
10 Claims. (Cl. 324—20)

The invention relates to a method and means for measuring the apparent diameter of a flying cathode ray spot on the face of a cathode ray tube.

In the prior art the size of a cathode ray spot on the face of a tube was determined to some extent by observing a monoscope pattern, requiring the use of a video signal as well as the pattern. Usually the pattern is in the form of black and white lines converging toward a point with scales running along the lines as well as horizontally and vertically. Some indication of the spot size would be obtained by noting where the resolution of white and black lines in the converging system stopped. This method does not give the size in units of a spot and is not accurate since it depends upon the ability of an observer to distinguish between the black and white lines and to note where they merge. Another method depends upon forming a raster on the face of the tube, and collapsing the height of vertical scanning until just before the horizontal scan lines become indistinguishable from one another. Then, knowning the height of the collapsed pattern and the number of lines in that height, the line width resolution could be obtained, from which could be obtained an indication or spot size. Still another method is microscopically measuring a standing spot. This lends itself to difficulties in burning of the phosphor, inaccuracy because a dynamic or moving spot is apparently of less height than a quiescent one and because of difficulty in the observer determining the exact edges of the spot, since the spot varies in intensity at its edges due to non-uniform cross sectional beam intensity and to aura created by spattering of the spot on the phosphor face of the tube. Yet another method is what may be termed the line slit method. In using this method, two close together, horizontal, scan lines are swept on the cathode ray tube. The vertical spacing between the centers of the two lines is measured with a microscope. These lines with their known spacing are scanned past a narrow slit and photomultiplier tube. The photomultiplier tube output is then traced on an oscilloscope. With a known separation between centers of lines the oscilloscope scale can be calibrated. The spacing between the lines is then varied until the lines overlap a certain, arbitrary amount as determined by observing the oscilloscope. At this point the spacing between the centers of the lines may be read from the scope which gives line resolution of the tube. One of the basic faults in this method is that the initial line spacing on which the oscilloscope is calibrated is determined by an observer looking through a microscope, and determining the exact centers of the two lines, since the lines are increasing in brightness from zero at their edges to a gradually approached maximum at their centers, with the apparent maximum brightness spread over a large area.

It is an object of this invention to improve prior art methods and means for making spot measurements so that exact spot size of a moving spot can be determined.

For a fuller understanding of this invention, attention is directed to the following specification and the drawings accompanying the same in which:

FIG. 1 is a diagrammatic view disclosing the principles of this invention.

FIG. 2 is a face view of a slitted mask used in the invention.

FIGS. 3 to 6 are diagrams illustrating the principles underlying the invention.

FIG. 7 is a view showing an exemplary trace on an oscilloscope used in carrying out the invention.

Referring to the drawings in greater detail, at 10, FIG. 1, is indicated a cathode ray tube, for example a picture tube, around whose neck 12 is seated the deflection coil assembly 14 having leads 16 for connection with the vertical drive of a television set and leads 18 connected with the horizontal deflection coils in the coil assembly and the horizontal deflection generator 19 similar to that in a television set. The tube itself is connected with the conventional leads 20 to which however no video modulation signal is applied. Instead, the cathode ray within the tube may be pulse modulated, as will be disclosed, by a pulser 22 connected to the control grid or cathode of the tube 10, depending on the type of modulation control. High voltage is supplied to the tube as usual through the high tension lead 24. As the cathode ray beam is swept solely by horizontal deflection across the face of the tube, it leaves a trace on the screen or face of the tube which has a height depending on the effective apparent vertical spot height. That is to say, the moving spot, due to the rapidity of its movement and the tapering electron density of the beam towards its edges makes a visible trace on the phosphor screen which is less in height than the overall vertical thickness of the cathode ray beam and it is this trace that is visible to the eyes and is effective in determining the line resolution of the picture. Supported co-axial with the neck of the picture tube and spaced from its face is a magifying lens 30 and supported in front of and spaced from the lens is an opaque body in the form of a card 32, the spacing from the lens being such as to focus the moving light spot 34 created on the face of the tube on the back of the card. The face of the card is shown in FIG. 2, the card being substantially parallel to the face of the tube and provided with two vertical slits 36, 37 with the slits at equal distances, laterally, from the axis of the picture tube. In front of the face of the card, in axial alignment with the tube axis is a photomultiplier tube 38. The photomultiplier tube output is connected to the vertical deflection posts of an oscilloscope 40 having a cathode ray tube 41 while the horizontal deflection generator 19 is connected with the horizontal deflection posts of the oscilloscope so that both the cathode ray in the picture tube and the scope ray are driven synchronously.

The slits on the card are of a height greater than the lens magnified diameter of any spot to be measured and of a spacing therebetween greater than the greatest diameter of any magnified spot to be measured. The width of the slot may conveniently be one tenth of the mean magnified diameter of the spots being measured. For illustration only, assuming the diameter of the spot 34 at the face of a picture tube to be .05 inch, for a given set of beam current and operating potentials, the size of the spot on the card, as indicated at 42 in FIG. 2, may be four times as large, i.e., .200 inch. The width of the slits may then be .02 inch and be spaced apart and of a height greater than .200 inch.

As the magnified light spot is swept across the card, vertical chordal bright segments appear through the slit, illuminating the photomultiplier tube to a greater and greater extent until the vertical diametrical portion of the spot appears through the slit; then, as the spot moves on, the illumination wanes. Since the photomultiplier tube is connected with the vertical deflection circuit of the oscilloscope, a Gaussian trace will appear on the face of the oscilloscope. If the spot were extinguished during the passage of the spot past the slit, as by proper application of voltage to the control grid of the picture tube, the trace on the oscilloscope would be horizontal. If the spot 42 be large in diameter, since it moves in synchronism with the cathode ray in the oscilloscope, the vertical deflection on the scope will appear much sooner than if the spot be small since then the oscilloscope trace will have been horizontal and formed for a period before the spot reaches the slit. Considering FIG. 3, during the time the spot moves the distance $d$ during the time $t_1$, the oscilloscope ray will have been displaced horizontally a distance across the face of the tube 41 and without vertical deflection; after time $t_1$, however, the spot will enter the slot and the photomultiplier tube will then transmit its signal to the oscilloscope to vertically deflect the ray therein. The Gaussian curve 44 formed on the face of the oscilloscope, see FIG. 4, will have a broad base near the left hand side of the tube 41. Then as the spot moves past the slit 36 and toward the second slit 37 and the light is entirely obturated by the card, the trace on the oscilloscope tube 41 will be a horizontal line. When the spot passes the slit 37, a second Gaussian curve will be formed similar to the first. In the case of a much smaller spot, as indicated at 46 in FIG. 5, the distance required to reach the slit 36 is an amount $k$ greater than the original distance $d$ and during the extra time $t_2$ required to traverse the distance $k$, the oscilloscope will have made a longer horizontal trace than before. As a result, see FIG. 6, a Gaussian trace with much narrower base, as illustrated at 48 will have been formed on the tube 41, for, not only will the spot enter the slit much later, but it will leave it much sooner.

To prevent phosphor burn on the picture tube and to facilitate making readings on the tube 41 it is desirable to pulse modulate the beam of the cathode ray tube 10 so that, as the spot traverses the slits 36 and 37, discrete vertical flashes will occur, as for example ten flashes for each passage of the spot on its active scan. Thus instead of smooth curves being formed on the tube 41, there will be formed vertical lines as illustrated in FIG. 7 together with horizontal traces when the spot is not exposed through the slits 36 and 37.

As seen in FIG. 7, a scale 50 may be placed on the face of the oscilloscope tube 41 to read the spot diameter. The scale has its zero indication at the point on the face of the tube beneath where the vertical deflection line on the oscilloscope face is greatest, corresponding to the passage of the vertical diameter of the spot past the slit 36. The value 10 is likewise placed on the tube 41 at a spot corresponding to the passage of the same spot diameter past the slit 37. Then the distance between the marks is divided up into any convenient number of divisions, as for example 10 major divisions, with each major division divided up into 10 subdivisions. If the distance apart on the card 32 of the vertical center lines of the slits 36 and 37 were, for example, .250 inch, then the much larger distance between 0 and 10 on the oscilloscope tube 41, and which may be a four inch or larger tube would represent .250 inch. Thus one subdivision on the tube 41 would represent .0025 inch. Therefore the oscilloscope may be calibrated in inches with the subdivisions distinct from one another.

If it is desired to determine how large a spot is from its center to edge where the edge brightness is 10% of the brightness at the center, the curve formed on the tube 41 or the vertical line can easily be broken up or scaled off to determine where the one tenth maximum value is located and it can be easily determined how many subdivisions this point on the curve, or this vertical line is from the peak value. Since the subdivisions were counted from the center toward one edge rather than toward both edges, the diameter of the magnified spot to this 10% level is obviously two times the counted number of subdivisions. Since a lens magnification of four has been assumed, the actual diameter of the spot at this 10% level is one quarter of the calculated value. The 10% level is chosen to give clearer readings of diameters than could be obtained by reading to the lowest edge of the curve, and which curve may be quite flat at the edges.

For the purposes of spot diameter comparisons, this 10% level reading is found eminently satisfactory.

If finer readings be desired, the slits may be decreased in width and where the cathode ray tube is modulated, the pulse rate of modulation may be increased.

Having thus described the invention what is claimed is:

1. The method of measuring moving cathode ray spot diameters formed on the screen of a cathode ray tube which comprises horizontally scanning the spot across the face of the tube, directing the resultant light image onto an opaque surface with a pair of vertical spaced apart slits defining an unbroken opaque area therebetween, the spacing between said slits being greater than the width of the slits, picking up the light transmitted through the slits, and translating the light as picked up into traces on an oscilloscope.

2. The method of measuring moving cathode ray spot diameters on the face of a cathode ray tube which comprises horizontally scanning the ray across the face of the tube while pulsing the ray on its active scan, picking up the resultant light flashes on the face of the tube, directing the same onto an opaque body provided with a pair of spaced apart slits defining an unbroken opaque area therebetween, the spacing between said slits being greater than the width of the slits and translating the light passed through said slits into curves on an oscilloscope.

3. In a system for determining the size of a spot formed by a moving ray on the face of a cathode ray tube, a cathode ray tube, means for horizontally deflecting the ray to form a light trace on the face of the tube, an opaque body in front of the tube, two laterally spaced apart vertical slits in the opaque body defining an unbroken opaque area therebetween, the spacing between said slits being greater than the width of the slits, a photomultiplier tube picking up the light transmitted through the slits, an oscilloscope connected to the last tube, and means synchronizing the sweep of the ray in the cathode ray tube with that in the oscilloscope.

4. In a system for determining the size of a spot formed by a moving ray on the face of a cathode ray tube, a cathode ray tube, means for horizontally deflecting the ray to form a light trace on the face of the tube, a magnifying lens in front of the face of the tube to pick up the light trace, a card in rear of the lens to receive the moving light image of the spot as it moves on the face of the tube and as enlarged by the lens, two vertical spaced apart slits in the card through which the moving spot is visible, the slits defining an opaque area therebetween, with the spacing between the slits greater than the width of the slits, a photomultiplier tube in front of the card to receive the light transmitted through the slits, an oscilloscope whose vertical input is connected to the output of the last tube and means synchronizing the sweep of the ray in the cathode ray tube with that in the oscilloscope.

5. In a system for determining the size of a spot formed by a moving ray on the face of a cathode ray tube, a cathode ray tube, means for horizontally deflecting the ray to form a light trace on the face of the tube, means for pulsing the ray while deflecting the same, an opaque body in front of the tube, two laterally spaced apart vertical slits in the opaque body, the slits defining an opaque area therebetween, with the spacing between the slits greater than the width of the slits, a photomultiplier tube picking up the light transmitted through the slits, an oscilloscope connected to the last tube, and means synchronizing the sweep of the ray in the cathode ray tube with that in the oscilloscope.

6. In a system for determining the size of a spot formed by a moving ray on the face of a cathode ray tube, a cathode ray tube, means for horizontally deflecting the ray to form a light trace on the face of the tube, means for pulsing the ray while deflecting the same, a magnifying lens in front of the face of the tube to pick up the light trace, a card in rear of the lens to receive the moving light image of the spot as it moves on the face of the tube and as enlarged by the lens, two vertical spaced apart slits in the card through which the moving spot is visible, the slits defining an opaque area therebetween, with the spacing between the slits greater than the width of the slits, a photomultiplier tube in front of the card to receive the light transmitted through the slits, an oscilloscope whose vertical input is connected to the output of the last tube and means synchronizing the sweep of the ray in the cathode ray tube with that in the oscilloscope.

7. The method of measuring moving cathode ray spot diameters formed on the screen of a cathode ray tube which comprises horizontally scanning the spot across the face of the tube, directing the resultant light image onto an opaque surface with a pair of vertical slits of equal width and spaced apart a distance greater than the width of the slits, picking up the light transmitted through the slits and translating the light as picked up into traces on an oscilloscope.

8. The method of measuring moving cathode ray spot diameters formed on the screen of a cathode ray tube which comprises horizontally scanning the spot across the face of the tube, directing the resultant light image onto an opaque surface with a pair of vertical slits of equal width and spaced apart a distance greater than the width of the slits, the vertical height of the slits being at least ten times the width of the slits, picking up the light transmitted through the slits and translating the light as picked up into traces on an oscilloscope.

9. The method of measuring moving cathode ray spot diameters formed on the screen of a cathode ray tube which comprises horizontally scanning the spot across the face of the tube, directing the resultant light image onto an opaque surface with a pair of vertical slits spaced apart a distance greater than the width of the slits, the vertical height of the slits being at least ten times the width of the slits, picking up the light transmitted through the slits and translating the light as picked up into traces on an oscilloscope.

10. In a system for measuring the size of a spot on the face of a cathode ray tube comprising said cathode ray tube, a photo tube, an opaque body having parallel vertical slits, said body being located between the face of the tube and photo tube and an oscilloscope having a vertical input and an oscilloscope tube, means for simultaneously causing the horizontal scan of electron beams across the faces of the cathode ray tube and the oscilloscope tube, conductors connecting the output of the photo tube to the vertical input of the oscilloscope, the slits therebetween defining an unbroken opaque area, the slits being narrower than the width of opaque body between the slits, and the face of the oscilloscope being provided with a fixed linear horizontal scale, whereby the horizontal distance between the top of a Gaussian curve and its base appearing on the face of the oscilloscope tube as a result of scanning the cathode ray tube may be scaled on the horizontal scale, said distance being a measure of the width of the spot scanning the cathode ray tube.

References Cited in the file of this patent
UNITED STATES PATENTS

| | | |
|---|---|---|
| 2,460,471 | Schade | Feb. 1, 1949 |
| 2,763,833 | Brumbaugh | Sept. 18, 1956 |
| 2,777,113 | Packard | Jan. 8, 1957 |
| 2,801,385 | Bendell | July 30, 1957 |
| 2,811,890 | Wadey | Nov. 5, 1957 |
| 2,935,558 | Van Winkle | May 3, 1960 |